(12) United States Patent
Kaidi (10) Patent No.: US 11,283,817 B2
(45) Date of Patent: Mar. 22, 2022

(54) SYSTEM TO PROTECT AGAINST PASSWORD SPRAYING

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 257 days.

(21) Appl. No.: 16/731,964

(22) Filed: Dec. 31, 2019

(65) Prior Publication Data

US 2021/0203675 A1 Jul. 1, 2021

(51) Int. Cl.
*H04L 29/06* (2006.01)
*H04L 9/32* (2006.01)

(52) U.S. Cl.
CPC ........ *H04L 63/1416* (2013.01); *H04L 9/3247* (2013.01); *H04L 63/1425* (2013.01)

(58) Field of Classification Search
CPC . H04L 63/1416; H04L 63/1425; H04L 9/002; H04L 9/3226
See application file for complete search history.

(56) References Cited

U.S. PATENT DOCUMENTS

| | | | | |
|---|---|---|---|---|
| 2008/0155651 A1* | 6/2008 | Wasmund | ............... | G06F 21/55 726/2 |
| 2012/0284783 A1* | 11/2012 | Jakobsson | .......... | G01B 9/02083 726/6 |
| 2015/0242603 A1* | 8/2015 | Cross | ...................... | G06F 21/45 726/7 |
| 2015/0288694 A1* | 10/2015 | Liebl, III | ............ | H04L 63/0884 713/182 |
| 2016/0275272 A1* | 9/2016 | Koshinuma | ............. | G06F 21/31 |

OTHER PUBLICATIONS

Schechter, Stuart, Yuan Tian, and Cormac Herley. "StopGuessing: Using guessed passwords to thwart online guessing." 2019 IEEE European Symposium on Security and Privacy (EuroS&P). IEEE, 2019. (Year: 2019).*

* cited by examiner

*Primary Examiner* — Joseph P Hirl
*Assistant Examiner* — Ka Shan Choy
(74) *Attorney, Agent, or Firm* — Haynes and Boone, LLP (57) ABSTRACT

A method includes determining, based on login information corresponding to a plurality of login attempts, that a set of password spray criteria have been satisfied. The method also includes generating respective scoring patterns corresponding to one or more password lengths and based on the respective scoring patterns, generating a common digital signature for a set of common passwords. The method further includes generating a spray digital signature for a set of potential spray passwords based on the respective scoring patterns. Additionally, the method includes comparing the spray digital signature with the common digital signatures to determine a number of matching components between the spray digital signatures and the common digital signature. Based on the number of matching components, the method includes determining whether a password spray has been attempted.

20 Claims, 5 Drawing Sheets

SYSTEM TO PROTECT AGAINST PASSWORD SPRAYING

BACKGROUND

Technical Field

This disclosure relates generally to information security and, more specifically, to a system to protect against password spraying.

DESCRIPTION OF THE RELATED ART

Password spraying may be a type of brute-force attempt to crack login passwords whereby a large number of accounts are targeted for login attempts using a set of commonly used passwords (e.g., "password", "1234", "admin", etc.). Characteristics of password spraying may include a relatively low number of login attempts for any given short period of time that are spread over a long period of time. The login attempts may be transmitted from distributed sources (e.g., distributed network addresses), and the same common passwords may be used. Further, the login attempts may be associated with a relatively high rate of failure.

Since only a few passwords may be attempted for an account with a service provider, such attempts may not trigger the service provider's lockout policy, and the account remains unlocked. Additionally, since the login attempts may be from distributed sources, detection of specific network addresses may be difficult and are therefore not blocked from communicating with the service provider. Further, since relatively few login attempts are made for any short period of time, rate-limiting policies of the service provider may not be triggered.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for a system to protect against password spraying. A service provider system maintained by a service provider is configured to detect potential password spraying attempts. According to a particular embodiment, the service provider system receives login information corresponding to a plurality of login attempts into various accounts with the service provider system. The login information may include one or more passwords and usernames. The service provider system may detect a potential password spraying attempt based on the login information satisfying a set of password spray criteria.

The password spray criteria may include a threshold number of passwords corresponding to failed login attempts for a threshold number of accounts over a predetermined time period from a threshold number of network addresses. In other words, for the predetermined time period (e.g., the past 48 hours), if the service provider system detects that, for each account of a threshold number of accounts (e.g., more than 100 accounts), the number of passwords that have been used in failed login attempts for that account is below a threshold number (e.g., less than 10), and the login attempts have been transmitted from more than one source (e.g., more than one network address) in which each source has attempted to login to more than one account, the service provider system may determine that the set of password spray criteria has been satisfied. It will be appreciated that example provided above is not limiting, and that various other password spray criteria may be used by the service provider system to detect a possible password spray attempt. As such, the set of password spray criteria may provide an initially coarse filter and/or alert for possible password spray attempts.

In response to determining that the set of password spray criteria have been satisfied, the service provider system is configured to generate a set of scoring patterns to score a set of common passwords. The set of common passwords may be determined based on historical information of past login attempts. For example, the top ten most used passwords within a predetermined time period may be designated as the set of common passwords. In other embodiments, the set of common passwords may be determined based on the passwords being used in the failed login attempts during the period in which the set of password spray criteria was satisfied.

Moreover, each scoring pattern in the set of scoring patterns may correspond to a respective password length. For example, a first scoring pattern may correspond to a password length of eight characters, a second scoring pattern may correspond to a password length of nine characters, and so on. The scoring patterns may be generated based on the respective password lengths of the common passwords in the set of common passwords. For instance, if the set of common passwords include common passwords that have lengths of nine characters, eleven character, and twelve characters, then the set of scoring patterns may include a first scoring pattern corresponding to a password length of nine characters, a second scoring pattern corresponding to a password length of eleven characters, and a third scoring pattern corresponding to a password length of twelve characters.

Additionally, each scoring pattern may be associated with a table that indicates respective values of a set of characters. Furthermore, a character in one scoring pattern may be scored a different value than in another scoring pattern. For example, in a first scoring pattern the character "a" may be scored with a value of 5 while in a second scoring pattern, it maybe scored with a value of 32. It will be appreciated that values given are merely exemplary and that characters may be scored with any value under any scoring pattern.

Further still, each scoring pattern may indicate one or more index positions that are not to be scored. For example, for the password "admin", the character "a" may have an index position of 0, the letter "d" may have an index position of 1, the letter "m" may have an index position of 2, the letter "i" may have an index position of 3, and the letter "m" may have an index position of 4. As such, an example scoring pattern corresponding to a password length of five characters may indicate that index positions 0 and 3 are not to be scored (e.g., have a value of 0).

Based on the set of scoring patterns, the service provider system scores each common password in the set of common passwords. A common digital signature may be generated based on the respective score. According to a particular embodiment, the common digital may be a vector that includes each of the respective scores for the common passwords in the set of common passwords.

The service provider system may continue to monitor subsequent login attempts at run-time to determine whether to initiate a matching session. The service provider system initiates a matching session if it detects that run-time login information corresponding to login attempts at run-time satisfy a set of matching criteria. The set of matching criteria may include a threshold number of network addresses attempting to login to a particular account within a predetermined time period with at least one unsuccessful login attempt.

Upon initiating a matching session, the service provider system determines a set of potential spray passwords for the matching session. The set of potential spray passwords may be determined based on the passwords that were used for login attempts during the period in which the set of matching criteria was satisfied. As such, the service provider system may score each potential spray password of the set of potential spray passwords according to the set of scoring patterns used to score the set of common passwords. The service provider system may further generate a spray digital signature based on the scores of the spray passwords. According to a particular embodiment, the spray digital signature may be a vector including the respective score of each potential spray password from the set of potential spray passwords.

To this end, the service provider system may compare the common digital signature with the spray digital signature to determine a number of matching scores between the digital signatures. If the number of matching scores satisfies a number threshold, the service provider system determines that a password spray is being attempted and performs one or more remediation actions in response. The remediation actions can include, but are not limited to, account restrictions for accounts corresponding to the login attempts, password resets, security challenges, block of network address (e.g., blocking Internet Protocol addresses), and/or the like.

Figure 1:
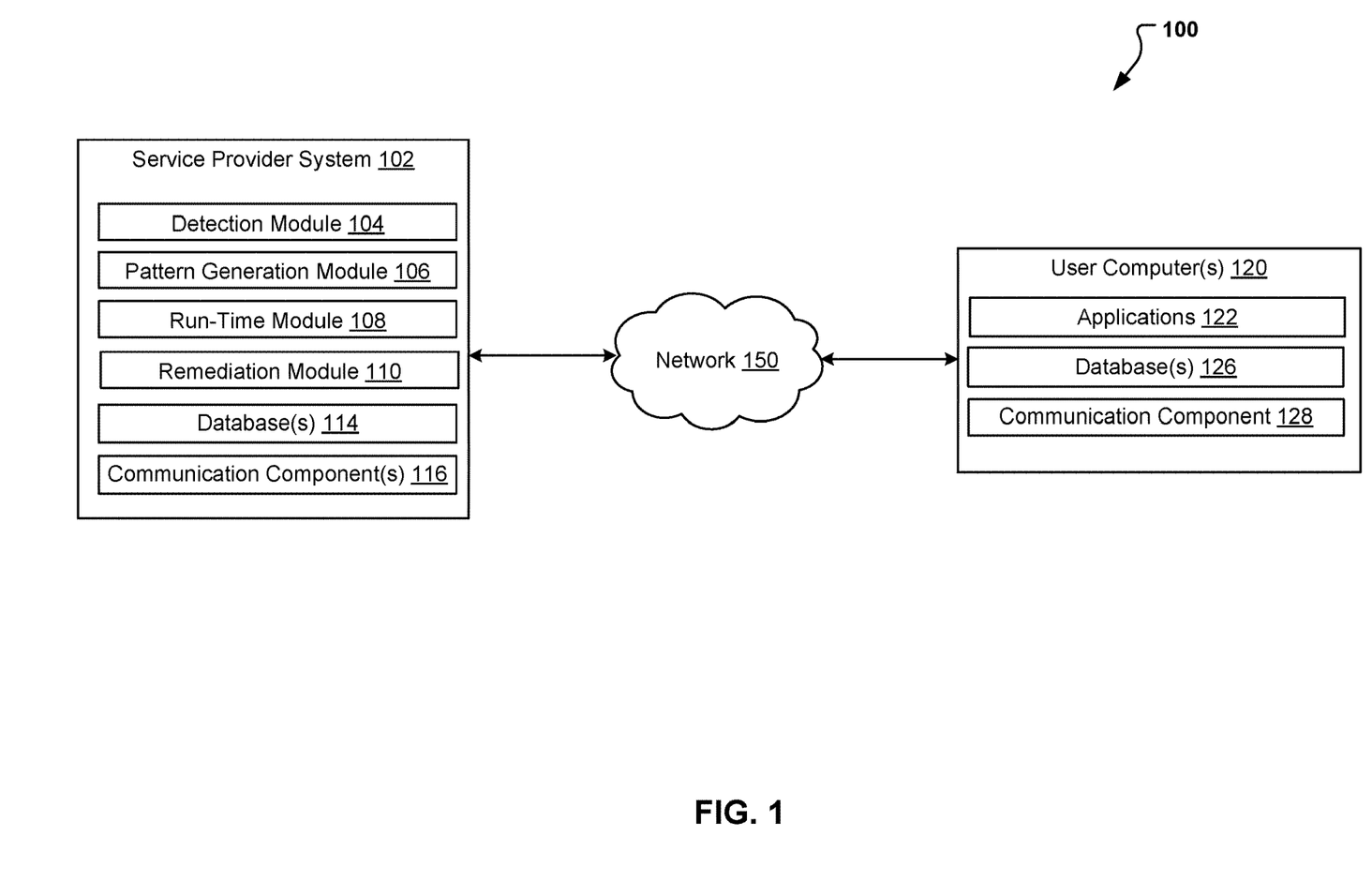
FIG. 1 is a block diagram illustrating an example system to protect against password spraying, according to some embodiments.

FIG. 1 is a block diagram illustrating an example system 100 to protect against password spraying. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a detection module 104, a pattern generation module 106, a run-time module 108, a remediation module 110, database(s) 114, and communication components 116. Each of the components of the service provider system 102 may communicate with each other to implement the system to protect against password spraying, as will be described in more detail below.

The detection module 104 is configured to detect potential password spraying attempts based on login information corresponding to a plurality of login attempts into various accounts with the service provider system 102. The login information may include and/or other indicate one or more passwords that were used for the plurality of login attempts. As such, the detection module 104 may detect a potential password spraying attempt based on the login information satisfying a set of password spray criteria.

The set of password spray criteria may be satisfied if, for a predetermined time period, a threshold number of failed login attempts for each of a threshold number of accounts are made by a threshold number of network addresses (e.g., Internet Protocol (IP) addresses). For example, for a predetermined time period (e.g., the past 48 hours), if the service provider system detects that, for each account of a threshold number of accounts (e.g., more than 100 accounts), the number of passwords that have been used in failed login attempts for that account is below a threshold number (e.g., less than 10), and the login attempts have been transmitted from more than one source (e.g., more than IP address), the service provider system may determine that the set of password spray criteria has been satisfied.

The pattern generation module 106 may be configured to generate a set of scoring patterns in response to the detection module 104 detecting a potential password spraying attempt (e.g., the set of password spray criteria being satisfied). The pattern generation module 106 may score a set of common passwords based on the set of scoring patterns. As such, the set of common passwords may be determined based on login information of past login attempts (e.g., the top ten most used passwords) over a predetermined period of time. In certain embodiments, the set of common passwords may be determined based on the passwords being used in the failed login attempts during the period in which the set of password spray criteria was satisfied.

Figure 3:
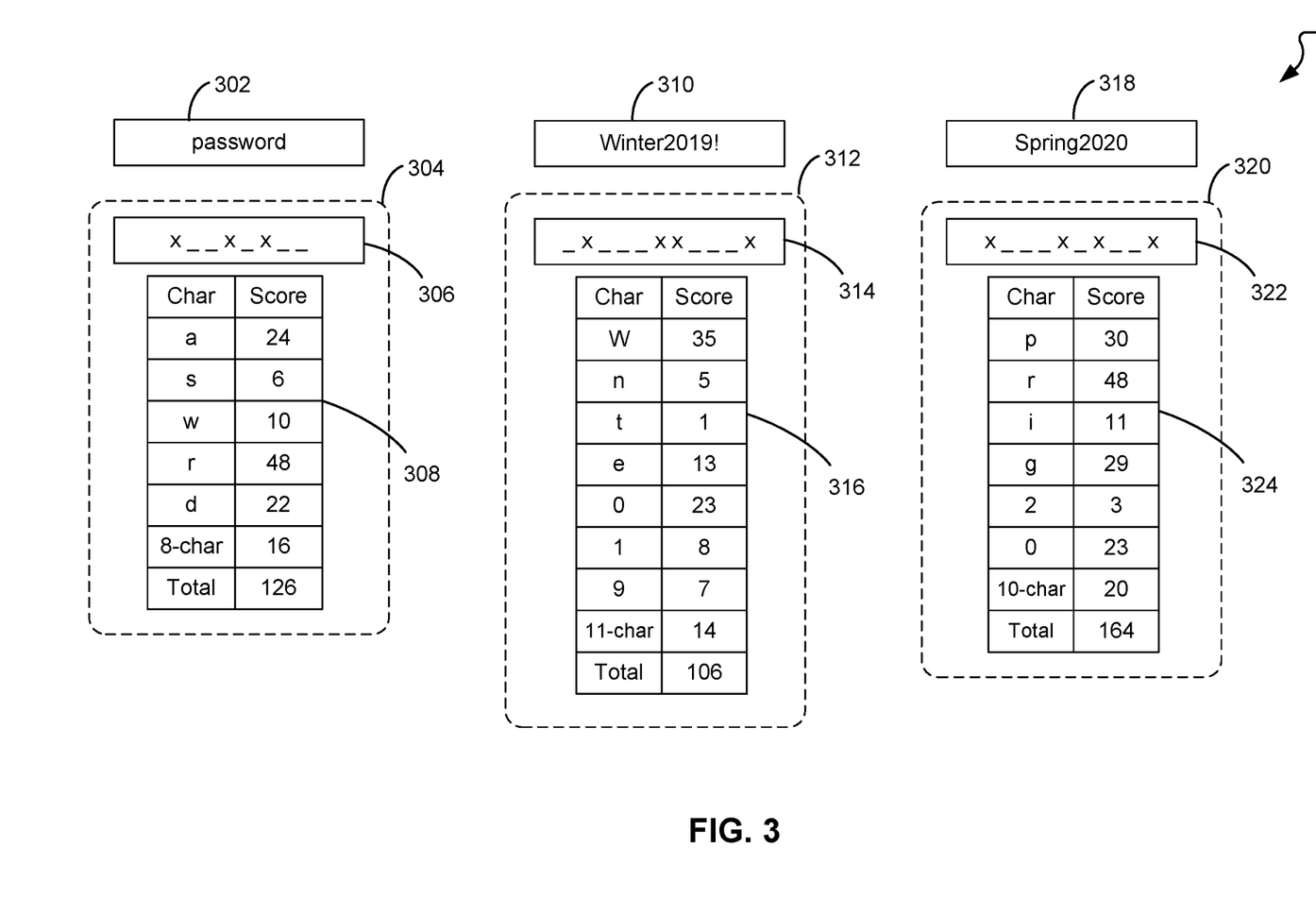
FIG. 3 is a diagram illustrating various scoring patterns, according to some embodiments.

Moreover, each scoring pattern in the set of scoring patterns may correspond to a respective password length. For example, a first scoring pattern may correspond to a password length of eight characters, a second scoring pattern may correspond to a password length of nine characters, and so on. The scoring patterns may be generated based on the respective password lengths of the common passwords in the set of common passwords. For instance, if the set of common passwords include common passwords that have lengths of nine characters, eleven character, and twelve characters, then the set of scoring patterns may include a first scoring pattern corresponding to a password length of nine characters, a second scoring pattern corresponding to a password length of eleven characters, and a third scoring pattern corresponding to a password length of twelve characters For example, referring to FIG. 3, a set of common passwords 302, 310, and 318 are illustrated along with their respective scoring patterns 304, 312, and 320. Common password 302 ("password") may be scored by a scoring pattern 304 corresponding to eight-character length passwords. The scoring pattern 304 may indicate one or more index positions 306 that are not to be scored as wells as a scoring table 308 that indicates respective values of different characters. The scoring table 308 depicted in FIG. 3 shows the values corresponding to characters that are scored in the common password 302, but it will be appreciated that the scoring table 308 may include values associated with various other characters as well, though not shown. According to the index positions 306, index positions marked by an "x" may indicate the corresponding index position is not scored (e.g., index positions 0, 3, and 7). This is to introduce some randomness into the scoring pattern 304. Common password 302 is given a score of 126 based on scoring pattern 304.

Similarly, common password 310 ("Winter2019!) may be scored by scoring pattern 312, which scores passwords having a length of eleven characters. Scoring pattern 312 may indicate index positions 314 that are unscored and may also indicate scoring table 316. It will be appreciated that scoring table 316 can be different from scoring table 314, or in other implementations, may be the same. Common password 310 is given a score of 106 based on the scoring pattern 312.

Common password 318 ("Spring2020") may be scored by scoring pattern 320, which scored passwords having a length often characters. Scoring pattern 320 may indicate index positions 322 that are unscored and may also indicate scoring table 324. Scoring table 320 may be different than scoring table 316 and/or scoring table 314. Common password 318 is given a score of 164 based on scoring pattern 320.

According to a particular embodiment, new scoring patterns for the various password lengths may be randomly generated on a periodic basis. In other embodiments, new scoring patterns for the various password lengths are generated each time the detection module 104 detects a potential password spray attempt. Thus, it will be appreciated that the scoring patterns 304, 312, and 320 illustrated in FIG. 3 are merely examples, and that various other scoring patterns are possible.

The pattern generation module 106 is further configured to generate a common digital signature based on scoring the set of common passwords. In certain implementations, the common digital signature may be a vector including the respective scores of each common password in the set of common passwords. For instance, referring to the example in FIG. 3, the common digital signature may be the vector (126, 106, 164). The pattern generation module 106 may store the common digital signature in a storage, such as database 114.

The run-time module 108 may be configured to monitor real-time login attempts to determine whether to initiate a matching session in which passwords received in real-time may be compared with the common digital signature. According to certain embodiments, the run-time module 108 may have the ability to initiate a matching session for a predetermined period subsequent to the detection module 104 detecting a potential password spray attempt (e.g., 72 hours). In other embodiments, the run-time module 108 continuously monitors login attempts and is able to initiate a matching session at any time.

As such, the run-time module 108 initiates a matching session in response to determining that login information associated with the monitored login attempts satisfy a set of matching criteria. For example, the set of matching criteria may be satisfied if the run-time module 108 determines login attempts, over a predetermined time period, for a single account from a threshold number of network addresses (e.g., IP addresses) in which a threshold number of the login attempts failed. As another example, the set of matching criteria may be satisfied if the run-time module 108 determines successful login attempts, over a predetermined time period, for a single account from a threshold number of network addresses. In another example, the set of matching criteria may be satisfied if the run-time module 108 determines login attempts, over a predetermined time period, for a threshold number of accounts from a single network address in which a threshold number of the login attempts failed. In yet another example, the set of matching criteria may be satisfied if the run-time module 108 determines successful login attempts, over a predetermined time period, for a threshold number of accounts from a single network address.

It will be appreciated that the listed set of matching criteria are examples and are not exhaustive. Thus, various other matching criteria are also contemplated within the present disclosure.

Upon initiating a matching session, the run-time module 108 determines a set of potential spray passwords for the matching session. The set of potential spray passwords may be determined based on the passwords that were used for login attempts during the period in which the set of matching criteria was satisfied. As such, the run-time module 108 may score each potential spray password of the set of potential spray passwords according to the set of scoring patterns (e.g., generated by the pattern generation module 106) used to score the set of common passwords. The run-time module 108 may further generate a spray digital signature based on the scores of the potential spray passwords. According to a particular embodiment, the spray digital signature may be a vector including the respective score of each potential spray password from the set of potential spray passwords.

To this end, the run-time module 108 may compare the common digital signature with the spray digital signature to determine a number of matching scores between the digital signatures. If the number of matching scores satisfies a number threshold, the run-time module 108 determines that a password spray is being attempted and instructs the remediation module 110 to perform one or more remediation actions in response. The remediation actions can include, but are not limited to, account restrictions for accounts corresponding to the login attempts, password resets, security challenges, block of network address (e.g., blocking Internet Protocol addresses), and/or the like The database(s) 114 stores various information that may include, for example, identifiers (IDs) such as operating system registry entries, cookies, IDs associated with hardware of the communication component 116, IDs used for payment/user/device authentication or identification, card IDs and transaction information associated with the card IDs, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access. The database 114 may also store the review queue 106 in some embodiments.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to login into one or more accounts with the service provider.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
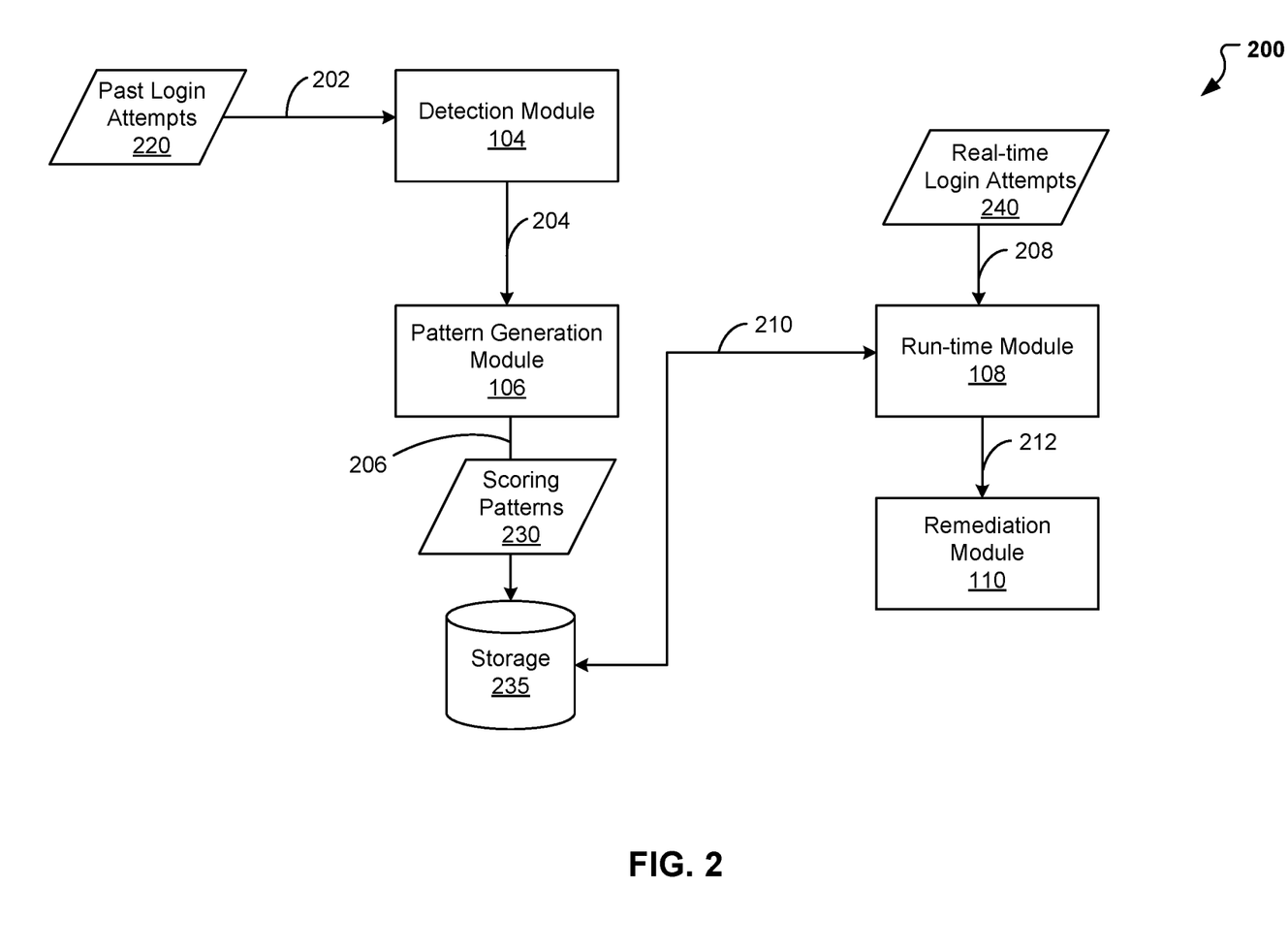
FIG. 2 is a diagram illustrating a data flow for a system to protect against password spraying, according to some embodiments.

FIG. 2 illustrates a data flow diagram 200 for a system for protecting against password spraying, in accordance with a particular embodiment. As shown in FIG. 2, the detection module determines, based on login information corresponding to one or more past login attempts 220, whether a set of password spray criteria have been satisfied at step 202. If the detection module 104 determines that the set of password spray criteria have been satisfied, the detection module 104 provides an indication of such to the pattern generation module 106.

At step 204, the pattern generation module 106 generates a set of scoring patterns 230, in which each scoring pattern in the set of scoring patterns corresponds to a particular password length. The pattern generation module 106 scores a set of common passwords based on the set of scoring patterns 230. At step 206, the set of scoring patterns 230 and the respective scores of each common password of the set of common passwords may be stored in a storage 235. In certain embodiments, the storage 235 may correspond to the database 114 although any type of storage is possible.

The run-time 108 module may monitor login information corresponding to real-time login attempts 240. At step 208, the run-time module 108 may determine that the login information corresponding to the real-time login attempts 240 satisfies a set of matching criteria. In response to this determination, the run-time module 108 may initiate a matching session. At step 210, the run-time module 108 may retrieve the set of scoring patterns 230 and the respective scores of the common passwords from the storage 235. During the matching session, the run-time module 108 may score a set of potential spray passwords (e.g., identified from the login information of the real-time login attempts 240) according to the scoring patterns 230.

The run-time module 108 compares the respective scores of each potential spray password from the set of potential spray passwords with the respective scores of the common passwords retrieved from the storage 235. Based on the comparison, the run-time module 108 determines a number of matches between the respective scores of the potential spray passwords and those of the common passwords. At step 212, if the number of matches satisfies a number threshold, the run-time module 108 instructs the remediation module 110 to perform one or more remediation actions.

Figure 4:
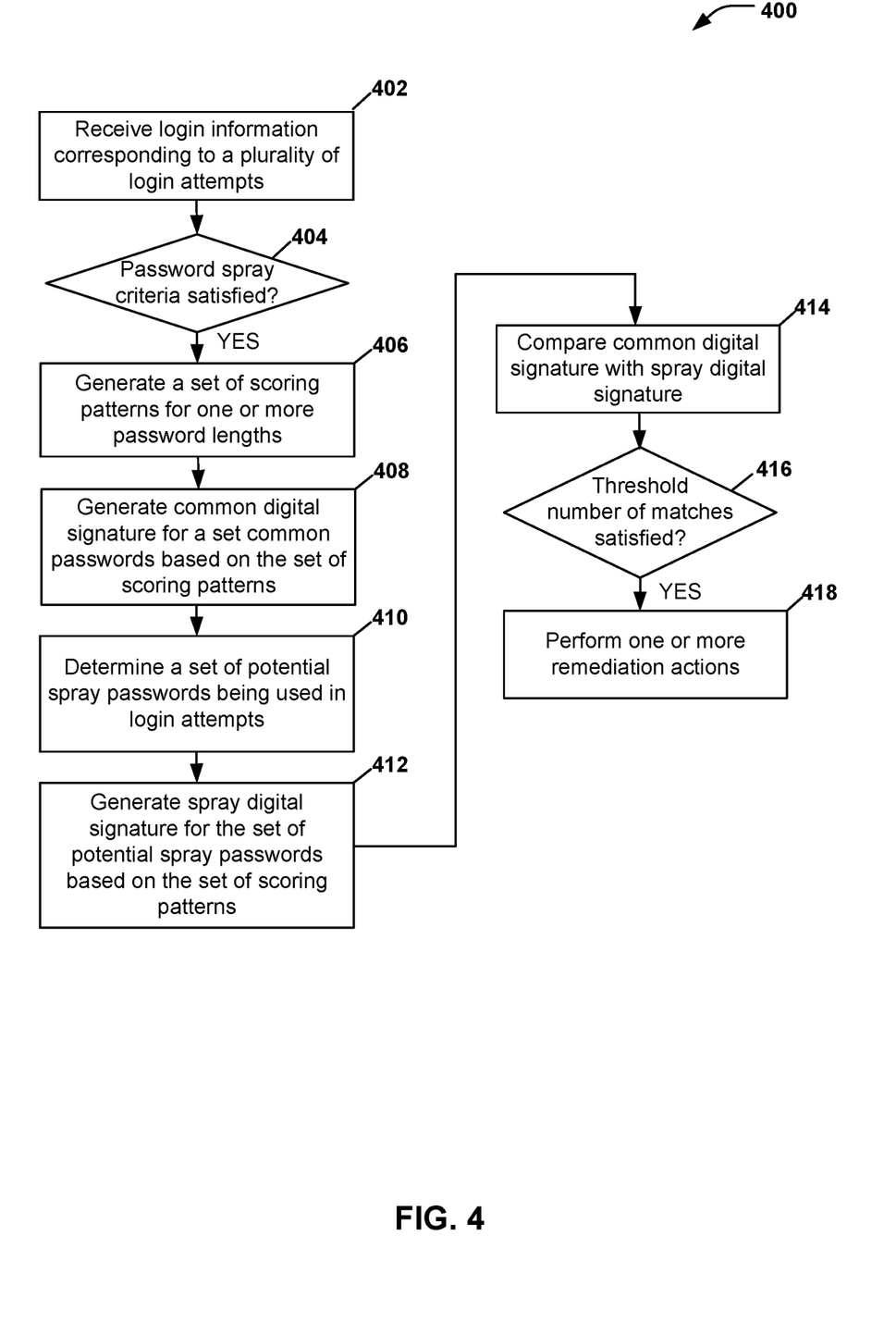
FIG. 4 illustrates a flow diagram that depicts a system to protect against password spraying, according to some embodiments.

FIG. 4 illustrates a flow diagram of a method 400 for a protecting against password spraying, in accordance with one or more particular embodiments. The method 400 may be performed by a service provider system, such as the service provider system 102. The method 400 beings at step 402, where the service provider system receives login information corresponding to a plurality of login attempts.

At step 404, the service provider system determines, based on the login information, whether a set of password spray criteria is satisfied. If so, the method 400 proceeds to step 406, wherein the service provider system generates a set of scoring patterns for one or more password lengths. At step 408, the service provider system generates a common digital signature for a set of common passwords based on the set of scoring patterns.

At step 410, the service provider system determines a set of potential spray passwords being used in one or more login attempts. The one or more login attempts may include the plurality of login attempts and/or may include login attempts occurring after the determination that the set of password spray criteria satisfied. At step 412, the service provider system generates a spray digital signature for the set of potential spray passwords based on the set of scoring patterns.

At step 414, the service provider system compares the common digital signature and the spray digital signature. At step 416, based on the comparison, the service provider system determines whether a number of matches between the common digital signature and the spray digital signature satisfies a number threshold. If so, the method 400 proceeds to step 418, where the service provider system performs one or more remediation actions.

Example Computing Device

Figure 5:
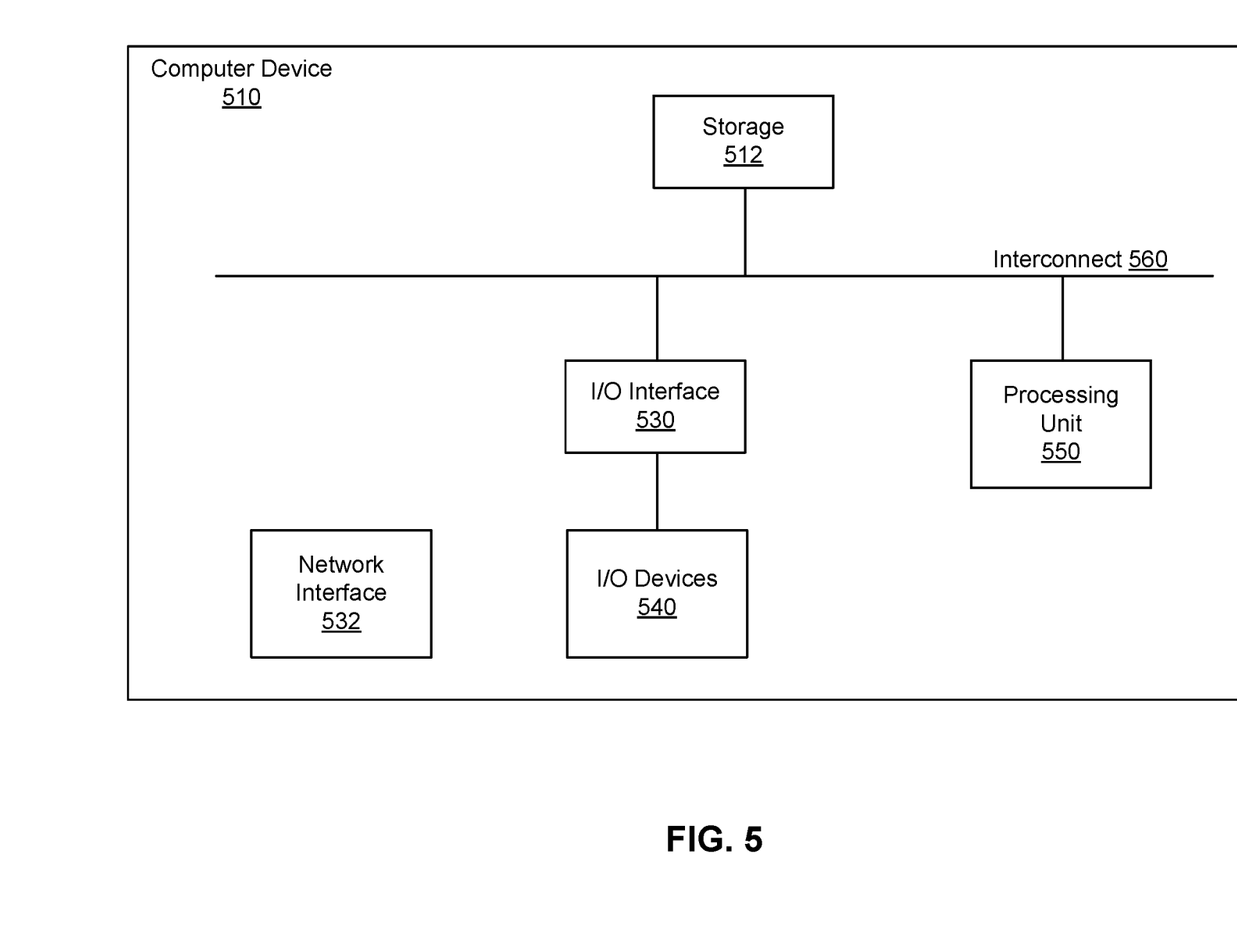
FIG. 5 is a block diagram illustrating an exemplary computing device, according to some embodiments.

Turning now to FIG. 5, a block diagram of one embodiment of computing device (which may also be referred to as a computing system) 510 is depicted. Computing device 510 may be used to implement various portions of this disclosure including any of the components illustrated in FIG. 1 and FIG. 2A-C. Computing device 510 may be any suitable type of device, including, but not limited to, a personal computer system, desktop computer, laptop or notebook computer, mainframe computer system, web server, workstation, or network computer. As shown, computing device 510 includes processing unit 550, storage 512, and input/output (I/O) interface 530 coupled via an interconnect 560 (e.g., a system bus). I/O interface 530 may be coupled to one or more I/O devices 540. Computing device 510 further includes network interface 532, which may be coupled to network 520 for communications with, for example, other computing devices.

In various embodiments, processing unit 550 includes one or more processors. In some embodiments, processing unit 550 includes one or more coprocessor units. In some embodiments, multiple instances of processing unit 550 may be coupled to interconnect 560. Processing unit 550 (or each processor within 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 512 may consist solely of volatile memory, in one embodiment. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In one embodiment, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
   one or more hardware processors; and
   at least one memory storing computer-executable instructions, that in response to execution by the one or more hardware processors, causes the system to perform operations comprising:

determining, based on login information corresponding to a plurality of login attempts, that a set of password spray criteria have been satisfied;

responsive to the set of password spray criteria being satisfied, generating respective scoring patterns corresponding to one or more password lengths;

based on the respective scoring patterns, generating a common digital signature for a set of common passwords;

determining a set of potential spray passwords, each potential spray password in the set of potential spray passwords being used in one or more login attempts;

generating a spray digital signature for the set of potential spray passwords based on the respective scoring patterns;

comparing the spray digital signature with the common digital signatures to determine a number of matching components between the spray digital signatures and the common digital signature; and based on the number of matching components, determining whether a password spray has been attempted.

2. The system of claim 1, wherein the set of password spray criteria comprises at least one of a number of password failures corresponding to the plurality of login attempts, a number of affected accounts corresponding to the plurality of login attempts, a length of time corresponding to the plurality of login attempts, or a number of network addresses corresponding to the plurality of login attempts.

3. The system of claim 1, wherein the respective scoring patterns include a first scoring pattern corresponding to a first password length, the first scoring pattern comprising a plurality of index positions, a number of index positions in the plurality of index positions being equal to the first password length.

4. The system of claim 3, wherein first scoring pattern indicates at least one index position of the plurality of index positions that is not scored.

5. The system of claim 4, wherein the first scoring pattern indicates a respective value for each character of a set of characters.

6. The system of claim 5, wherein the operations further comprise:

determining that a first common password of the set of common passwords is associated with a password length equal to the first password length;

determining, based on the first scoring pattern, respective values for each character in the first common password; and calculating a first digital signature corresponding to the first common password based on the respective values for each character in the first common password.

7. The system of claim 6, wherein at least one character of the first common password is not scored, the at least one character corresponding to the at least one index position indicated by the first scoring pattern.

8. The system of claim 1, wherein the operations further comprise:

comparing the number of matching components with a number threshold;

based on the comparing, determining that the number of matching components satisfies the number threshold; and responsive to the determining, performing one or more remediation actions.

9. The system of claim 8, wherein the one or more remediation actions comprise at least one of an account restriction, a password reset, a security challenge, or network address blocking.

10. A method, comprising:

generating, by a service provider system comprising one or more hardware processors, respective scores for each common password in a set of common passwords according to a set of scoring patterns, each scoring pattern of the set of scoring patterns corresponding to a different password length;

initiating a first matching session based on a set of password spray criteria being satisfied; and during the first matching session:

generating respective scores for each potential spray password in a set of potential spray passwords according to the set of scoring patterns, each potential spray password being used in a corresponding login attempt;

determining a number of matches between the respective scores for each common password and the respective scores for each potential spray password; and based on the number of matches, determining whether to perform one or more remediation actions.

11. The method of claim 10, wherein the set of scoring patterns are randomly generated in response to the initiating the first matching session.

12. The method of claim 10, further comprising:

subsequent to the initiating the first matching session, initiating a second matching session; and during the second matching session, generating randomly generating a second set of scoring patterns that is different than the set of scoring patterns of the first matching session, each scoring pattern of the second set of scoring patterns corresponding to a different password length.

13. The method of claim 12, further comprising:

during the first matching session, generating a first score for a first common password of the set of common passwords according to a scoring pattern of the set of scoring patterns; and during the second matching session, generating a second score for the first common password according to a scoring pattern of the second set of scoring patterns, the first score being different than the second score.

14. The method of claim 10, further comprising:

in response to determining that the number of matches satisfies a match threshold, performing the one or more remediation actions.

15. The method of claim 10, wherein the one or more remediation actions comprise at least one of an account restriction, a password reset, a security challenge, or network address blocking.

16. The method of claim 10, wherein the determining the number of matches is performed in response to identifying login attempts transmitted from a threshold number of network addresses for a threshold number of accounts within a predetermined time period.

17. A non-transitory computer readable medium storing computer-executable instructions that in response to execution by one or more hardware processors, causes a system to perform operations comprising:

initiating a first matching session based on a set of password spray criteria being satisfied; and during the first matching session:

generating a common digital signature corresponding to a set of common passwords according to a set of scoring patterns, each scoring pattern of the set of scoring patterns corresponding to a different password length;

generating a spray digital signature corresponding to a set of potential spray passwords according to the set of scoring patterns, each potential spray password being used in a corresponding login attempt;

determining a similarity between the common digital signature and the spray digital signature; and based on the similarity, determining whether to perform one or more remediation actions.

18. The non-transitory computer readable medium of claim 17, wherein the operations further comprise:

subsequent to the initiating the first matching session, initiating a second matching session; and during the second matching session, generating randomly generating a second set of scoring patterns that is different than the set of scoring patterns of the first matching session, each scoring pattern of the second set of scoring patterns corresponding to a different password length.

19. The non-transitory computer readable medium of claim 18, wherein a first common password from the set of common passwords is scored differently in the first matching session than in the second matching session.

20. The non-transitory computer readable medium of claim 17, wherein operations further comprise:

in response to determining that the similarity satisfies a similarity threshold, performing the one or more remediation actions.

* * * * *